(12) United States Patent
Sherman

(10) Patent No.: US 8,388,849 B2
(45) Date of Patent: Mar. 5, 2013

(54) METHOD AND APPARATUS FOR SKIMMING OIL FROM WATER USING ABSORBENT PADS

(76) Inventor: John Morgan Sherman, Bon Secour, AL (US)

( * ) Notice: Subject to any disclaimer, the term of this patent is extended or adjusted under 35 U.S.C. 154(b) by 298 days.

(21) Appl. No.: 12/852,697

(22) Filed: Aug. 9, 2010

(65) Prior Publication Data
US 2012/0031848 A1     Feb. 9, 2012

(51) Int. Cl.
*C02F 1/40* (2006.01)
(52) U.S. Cl. ............ 210/691; 210/237; 210/242.4; 210/485; 210/502.1; 210/747.6; 210/924
(58) Field of Classification Search .......... 210/237, 210/242.3, 242.4, 485, 502.1, 691, 747.6, 210/924, 693
See application file for complete search history.

(56) References Cited

U.S. PATENT DOCUMENTS

| | | | |
|---|---|---|---|
| 3,702,657 A * | 11/1972 | Cunningham et al. | 210/242.4 |
| 5,084,171 A * | 1/1992 | Murphy et al. | 210/238 |
| 5,169,519 A * | 12/1992 | Elsas | 210/145 |
| 5,186,831 A * | 2/1993 | DePetris | 210/242.4 |

* cited by examiner

*Primary Examiner* — Matthew Savage
(74) *Attorney, Agent, or Firm* — Mark Loftin

(57) ABSTRACT

An adjustable and removable skimming assembly is provided for attaching to the bow of a watercraft. When mounted, the skimming assembly presents vertically orientated starboard, port and bow cages that house oil absorbent padding. The cages with the positioned pads are largely porous so that at slow watercraft velocities, the water flows through the pads but the oil is retained within the pads across a substantially horizontal plane. As the pads become oil saturated along this common plane, the vertical cages are adjusted to expose a section of the pad that is not saturated. This process is repeated until the entire pad surface is saturated. The resistance force created by the water against the starboard and port cages during movement is countered by a plurality of tethering cables extending from the structural members attached to the bow of the watercraft to the outer edges of the cages. The lengths of these cables are such that the port and starboard cages are swept forward from the bow cage to form an oblique u-shape. As the skimmer moves through the water, this cage positioning creates a capture zone for funneling floating debris and oil toward the center of the bow cage where it can be collected and removed by other means.

6 Claims, 4 Drawing Sheets

METHOD AND APPARATUS FOR SKIMMING OIL FROM WATER USING ABSORBENT PADS

BACKGROUND OF THE INVENTION

This invention relates to a device installed on a vessel for skimming the surface of a body of water for collecting floating hydrocarbons by contacting the hydrocarbons with an absorbent pad material.

Numerous varieties of oil skimming vessels are known for skimming the surface of a body of water for collecting oil floating on the surface from oil spills, leaking oil wells, and the like. Vessels of this type generally operate on the principle that oil having a lower density than water will float on the water and can thereby be skimmed off. In a typical design, a weir or skimmer is mounted to collect only the surface portion of the water, which is then collected in a tank to give the oil a chance to float to the top where it is removed and the cleaned water discharged back into the body of water. Skimming vessels of this type typically work in conjunction with floating booms that are connected for directing or collecting the floating oil within the perimeter of the booms. Another common way of collecting and separating oil floating on a body of water is to use a boat having a rotating belt made out of synthetic fiber or other material specially selected for the oil to stick to and which allows the water to run through. The belt can be positioned and driven as an endless conveyor with one end protruding into the surface of the water and a squeegee arrangement located at the other end of the endless belt removes the oil collected on the belt, which is then dropped into a storage container. In U.S. Pat. No. 4,583,697, an inexpensive floating vessel operating on a skimming principle is shown that uses the engine propeller for drawing the surface oil/water mixture into a skimming system.

Many oil/water separators allow the oil/water mixture to settle in a tank either on the vessel or on shore allowing the oil to float to the top of the water where it is removed by pumping or gravity draining of the water layer. One prior oil/water separator adapted for land use can be seen in U.S. Pat. No. 4,042,512 to McCarthy, et al., where the oil/water mixture is directed against an angled corrugated surface and then through corrugated baffle members. In U.S. Pat. No. 4,583,697, the oil/water separator utilizes two tanks connected by a passageway in which the oil/water mixture is fed into the first tank, passes through a pair of check valves into the passageway where a plurality of baffles are mounted in a predetermined arrangement. As an alternative to gravimetric means for separating the oil and water, absorbent materials are commonly used for cleaning oil spills. In U.S. Pat. No. 5,834,385, a sorbent material is shown comprised of a first exposed outer layer of hydrophobic, liquid-permeable, fibrous polymeric nonwoven web and an absorbent body, adjacent the outer layer, comprising oil absorbent, cellulose-based material. The absorbent article is placed on a layer of oil resting on the surface of a body of water for oil spill clean up. The absorbent article selectively absorbs oil over water because the outer hydrophobic layer repels water but attracts oil and transfers the oil to the oil absorbent body encased between the exposed outer layers.

SUMMARY OF THE INVENTION

A skimming vessel for collecting hydrocarbons from the surface of a body of water is provided having a floating vessel with a broad forward structure for containing oil absorbent materials and presenting them in an adjustable manner to the oil on the surface of the water. As the vessel travels and oil on the surface saturates the absorbent padding, the padding is adjusted vertically to expose an unsaturated section of the padding to the water surface. One the full padding area is saturated with absorbed oil, the structure allows the pads to be removed from the water and disposed of. Fresh absorbent padding is placed back into the structure and skimming is resumed. The benefits of this device in oil spill clean-up operations are 1) large coverage area for a relatively small watercraft, 2) shortened time to cover large areas, 3) maximized loading efficiency of oil absorbent padding, and 4) capable of mounting and using the device on a wide variety of boats and barges commonly available in inland and coastal waterways.

BRIEF DESCRIPTION OF THE DRAWINGS

Other objects, features and advantages of the present invention will be apparent from the written description and the drawings, in which.

DESCRIPTION OF THE PREFERRED EMBODIMENT

Accordingly, the present invention is not to be construed as limited to the forms shown, which are to be considered illustrative rather than restrictive.

Figure 1:
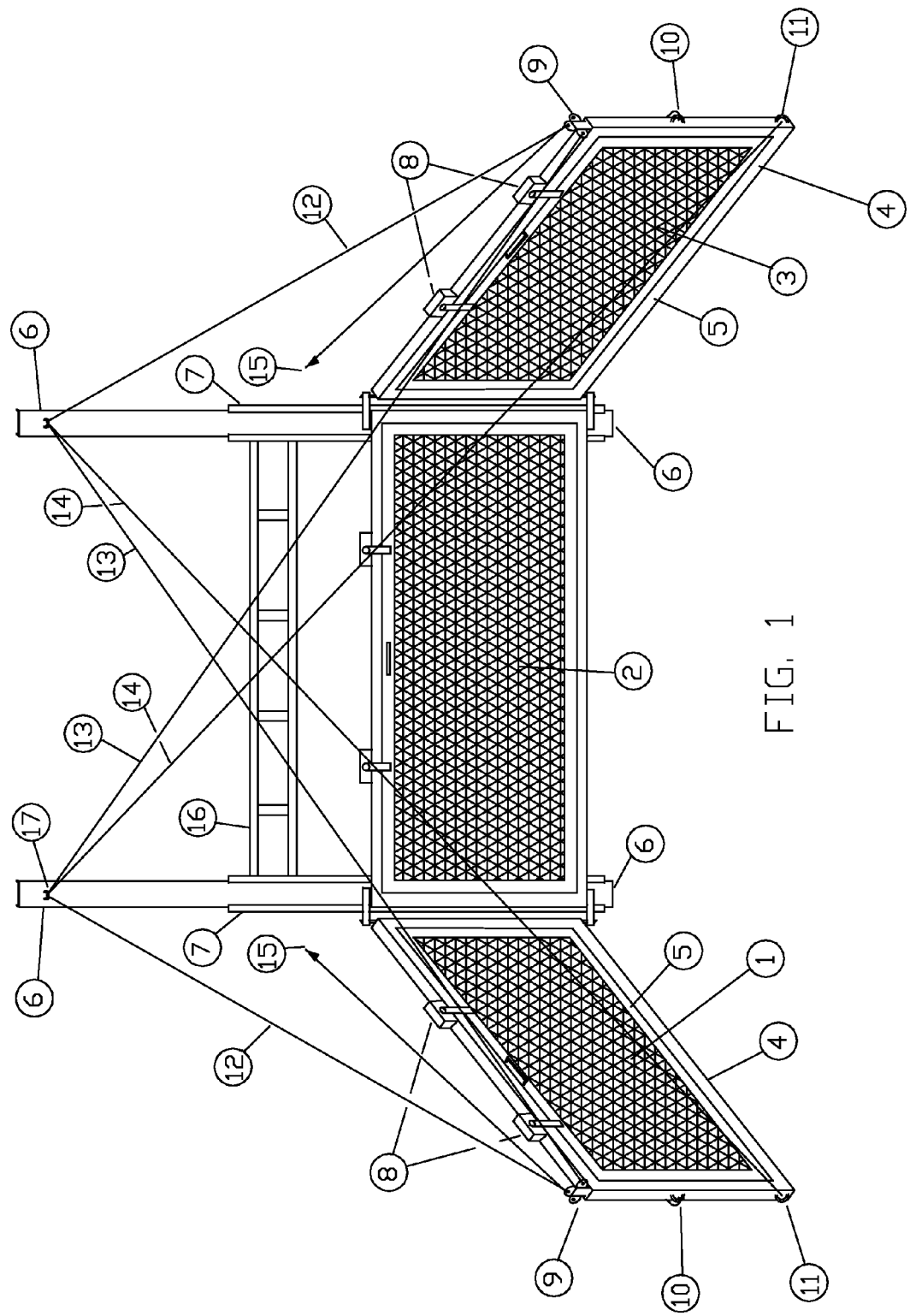
FIG. 1 shows a three-dimensional front view of the present invention in its state deployed and open for skimming.

In Reference to FIG. 1, the oil absorbent pads are contained within three cages, a starboard cage 1, a bow cage 2, and a port cage 3. Each cage is generally of rectangular shape having a height just larger than the absorbent pad being used. A commonly used absorbent pad is 24 inches wide by 96 inches long. The length of the cage can also be adjusted depending on the size of the watercraft and the available power for moving the cages through the water. The longer the length of the cage, the greater the drag force applied as the device moves through the water. Shorter cage lengths may be used for smaller boats while larger cages may be used for larger watercraft such as barges. For watercraft in the 20-24 feet length size, an 8 feet cage width is preferred. Each cage is comprised of back frame 4 and clamp frame 5. Spanning the inner cross section and attached to the back frame 4 is a rigid material that is porous to water yet provides enough structural strength to prevent bending under the force of water as it moves through the frame and to keep the absorbent pad in the substantially vertical position. In the inventor's preferred embodiment, 10-12 gauge expanded metal grating is preferred. However, other materials such wire mesh, plastic grating and similar materials may be substituted. When being readied for operation, the oil absorbent pads are laid side by side against the span grating of the back frame 4 covering the cross section of the frame. The pads are then held in place by inserting a clamp frame 5 inside the back frame. The clamp frame 5 is of just slightly less length and width than the back frame 4. In the preferred embodiment, each frame is fabricated from 1" square aluminum tubing, which provides a good balance between cost, weight, corrosion resistance, and strength. Other material having similar properties may be substituted. On top of the back frame's top member are a plurality of rotating clamps 8 that are comprised of a base block attached to the frame member and a rotating tab held on one end to the base block and pivoting thereabout. The tab is longer than the depth of the frame and the base block is mounted flush with the forward face of the back frame. When the tab is rotated to the down position, the tab extends over the top member of the clamping frame preventing it from moving outward and effectively holding it in place.

In continued reference to FIG. 1, each cage is position on a common horizontal plane by mounting to a pair of elevators 6 located one each on the port and starboard sides of the watercraft. Each cage is attached to the front face of the elevators so that the top and bottom frame members are essentially on the same horizontal plane. This allows the oil/water interface to contact essentially the same vertical dimension on each pad placed within the cages. In the preferred embodiment, the elevators are made from 4" aluminum "u-channel" which provides a good balance between cost, strength, corrosion resistance and weight. In the preferred embodiment, the flat backside of the "u-channel" is facing outward to provide a surface for attaching supports to hold the cages. Each elevator 6 is held laterally in place by a guide channel 7. In the preferred embodiment, the guide channel is made from "c-channel" so that it contains both sidewalls and forward walls to contain the elevator 6 yet allow vertical movement. The height of each elevator 6 is such that at its lowest elevation, the top of each cage is level with the surface of the water in which the device is being used. At the highest elevation, the cages are assessable by personnel on the watercraft so that saturated absorbent pads can be removed and fresh pads replaced.

In continued reference to FIG. 1, a plurality of guide wires is shown that connect the each elevator to various points on the edges of the port and starboard cages. These guide wires provide a counteracting tension to the forces applied to the cages as the watercraft moves through the water. At the top of each elevator 6 is a guide wire base 17. In the preferred embodiment, this base consists of a semi-circular loop welded to the back face of the elevator 6. This provides a forward-facing ring to which one end of the guide wire cable is attached using common means such as u-bolts, ring clamps, cable hooks, snap-eye hooks, etc. Each elevator has three primary guide wires. A top guide wire 12 attaches on one end to the top hole of the tri-hole adapter 9 and on the other end to the guide wire base 17. The tri-hole adapter 9 is attached to the top outer frame member of the port and starboard cages. The tri-hole adapter 9 is essentially a vertical cross-shaped object attached on the bottom cross-member to the top frame member of the cage and provides to provide a top, forward and aft attachment point for the guide wires. The top guide wire 12 is attached on one end to the top hole of the tri-hole adapter 9. The top cross guide wire 13 is attached on either the forward tri-hole adapter 9. A bottom cross guide wire 14 can attach on one end to either to the outer bottom edge loop 11 or middle edge loop 10. The other end of the bottom cross guide wire attaches to the elevator 6 on the opposite side of the port or starboard cage to which it attaches. Attaching this guide wire to the middle edge loop 10 is adequate for most operations. However, for faster watercraft speeds, strong water currents, or other situations where elevated tension forces are applied to the cages operation, the bottom cross wire 14 can be attached to the bottom edge loop 11. A fourth rear guide wire 15 attaches on one end to the aft hole of the tri-hole adapter 9 and on the other to an anchor point back on the either side of the watercraft. By detaching the top cross wire 13 and the bottom cross wire 14 from the elevator 6 and pulling on the rear guide wire 15, each port and starboard cage assembly can be swung backwards to the port and starboard sides of the watercraft. Personnel onboard the watercraft then has ready access to the cages to remove spent absorbent pads and replace them with fresh pads. The process is reversed to return the cages back to their working position. The bow cage 2 is accessible directly from bow of the watercraft.

In continued reference to FIG. 1, a guide channel cross brace assembly 16 is shown to provide additional strength to the assembly to oppose torque forces applied to the assembly when in operation. This cross brace is comprised of a pair of tubular members extending across the span of the of the two guide channels 7 near the upper end of the guide channels. A plurality of shorter vertical tubular members is welded between the horizontal span members to further strengthen the cross brace assembly.

The length of top cross wire 13 and the bottom cross wire 14 establish the angle the port and starboard cages make relative to the bow cage. In the preferred embodiment, the length of these wires is shortened to something less than the length that would allow all three cages to form a common vertical plane. As seen in FIG. 1, the shorter cross wire length results in the cages forming an oblique "u-shaped" capture zone when in operation. This oblique "u-shape" is preferred over a fully in-line cage position because clumps of floating oil that are caught by the moving watercraft are naturally funneled toward the center of the bow cage 2 by force of the water currents developed when the watercraft is moving forward with the device deployed. In an alternate embodiment, a separate capture container can be suspended out in front of and in the center of the bow cage. During watercraft movement, floating oil clumps and other solid debris within the capture zone move toward the center of the bow cage by water currents where they are trapped within the center container. When the oil absorbent pads are changed out, the center capture container can be emptied.

Figure 2:
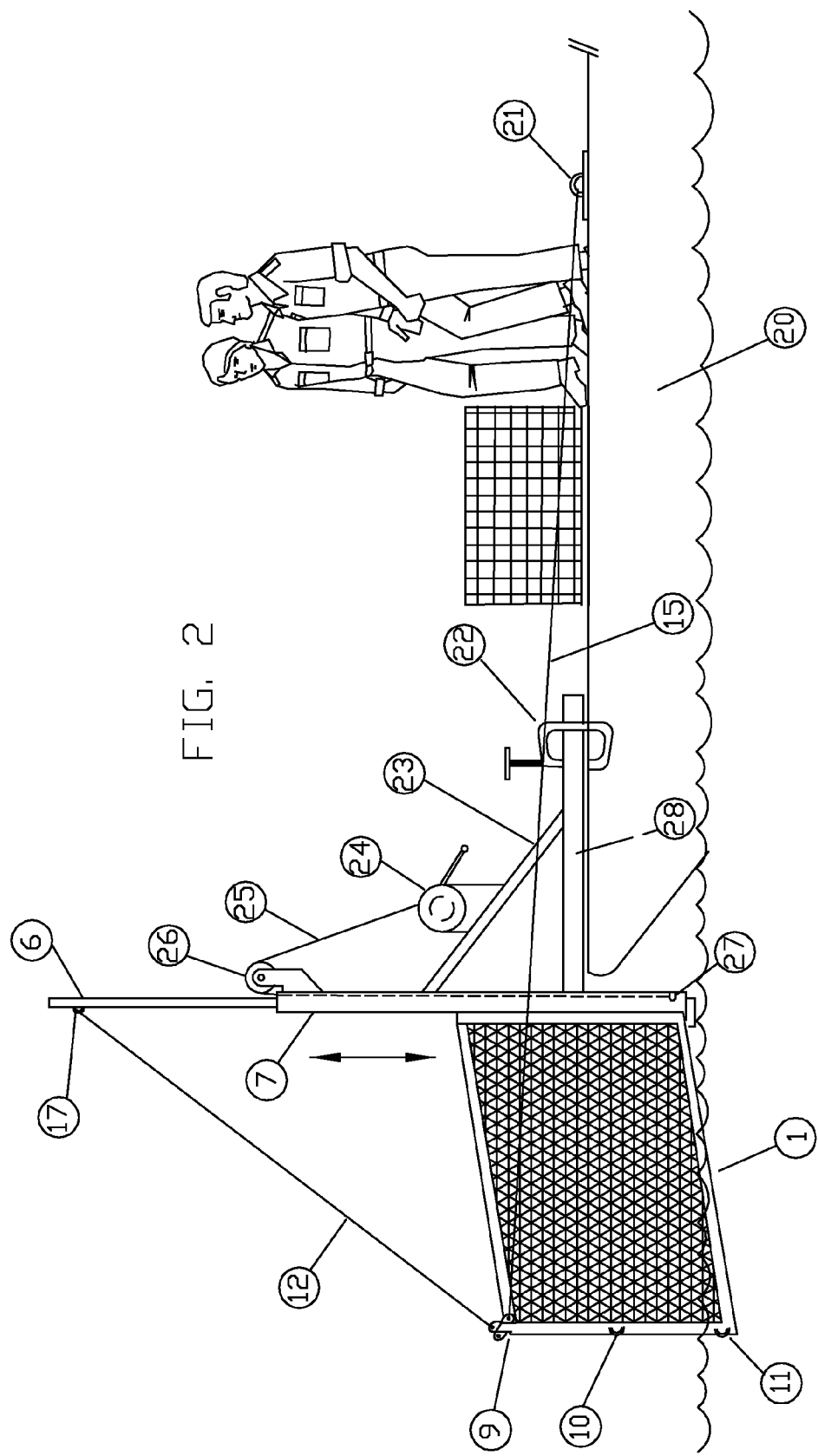
FIG. 2 shows an elevation view of the current invention as it is installed on a watercraft on the water surface with its side wings deployed and tethered.

In reference to FIG. 2, a port side view of a watercraft 20 is shown with the device attached to the bow and lowered into the water. It is understood that the descriptions set forth on FIG. 2 are duplicated the starboard side cage. The rear guide wire 15 is shown attached on one end to the tri-hole adapter 9 and on the other end to a deck tie-down brace 21. The primary purpose of the rear guide wire is both to prevent the cages from closing forward when the watercraft moves in a reverse direction and to give the operators a means to pull the side cages back to the boat deck so that they can be cleaned or have their oil pads changed. The device is attached to and supported on the bow of the boat by a base channel 28 that is attached on one end to the back side of the guide channel 7 and runs back along the top of the bow of the watercraft. In general, the weight of the device causes the base channel 28 to rest on the bow deck of the watercraft. However, when in motion, the device encounters additional torsional moments that would tend to oppose gravity and lift base channel off the deck surface. To counter these forces, a clamping means 22 is used to secure the aft end of the base channel 28 to the deck surface. Other obvious means of attaching the base channel to the watercraft bow deck include directly bolting the base channel to the deck surface. However, part of the advantage of this device is its ability to work with a variety of recreational watercraft on a temporary basis to rapidly remediate a sudden surge of oil into an inland waterway. As such, a removable clamping means would be preferred to avoid permanently altering the watercraft's deck.

In continued reference to FIG. 2, the vertical orientation guide channel 7 and the horizontal orientation of the base channel 28 are reinforced by a channel brace 23 that attaches on one end to the base channel 28 and on the other to the guide channel 7. A jack assembly is shown comprised of a cable spool crank 24, an elevator cable 25, a redirecting pulley 26 and a terminating ring 27. The terminating ring 27 is a semi-circular loop attached to the inside surface of the elevator 6 channel near the bottom end. The elevator cable 25 is attached on one end to the terminating ring 27, runs up through the guide channel 7 and over the pulley 26, then is spooled around the cable crank 24. As the arm of the cable spool crank is turned forward, a lifting force is applied to the elevator 6, which moves the elevators and attached cages upward as the elevators telescope within the guide channel 7. As the spool crank is turned backwards, gravity pulls the elevators and attached cages downward recessing the elevators back into the guide channels 7. The primary purpose of the jack assembly is to allow the device operators to adjust the oil/water interface contact point on the oil absorbent pads in the cages. Since the oil forms a thin sheen on top of the water, the pads typically only absorb the sheen at the interface point. To utilize more of the pads absorbing capacity, when the pad becomes saturated along one lateral portion, an unsaturated section of the same pad can be brought to the oil/water interface by lifting all of the cages with the jack assembly. In FIG. 2, a manually operated hand spool crank is shown. However, it is understood than any number of standard force actuators could be used such as motorized wenches, hydraulic linear actuators, or motorized or pneumatic rotary actuators.

Figure 3:
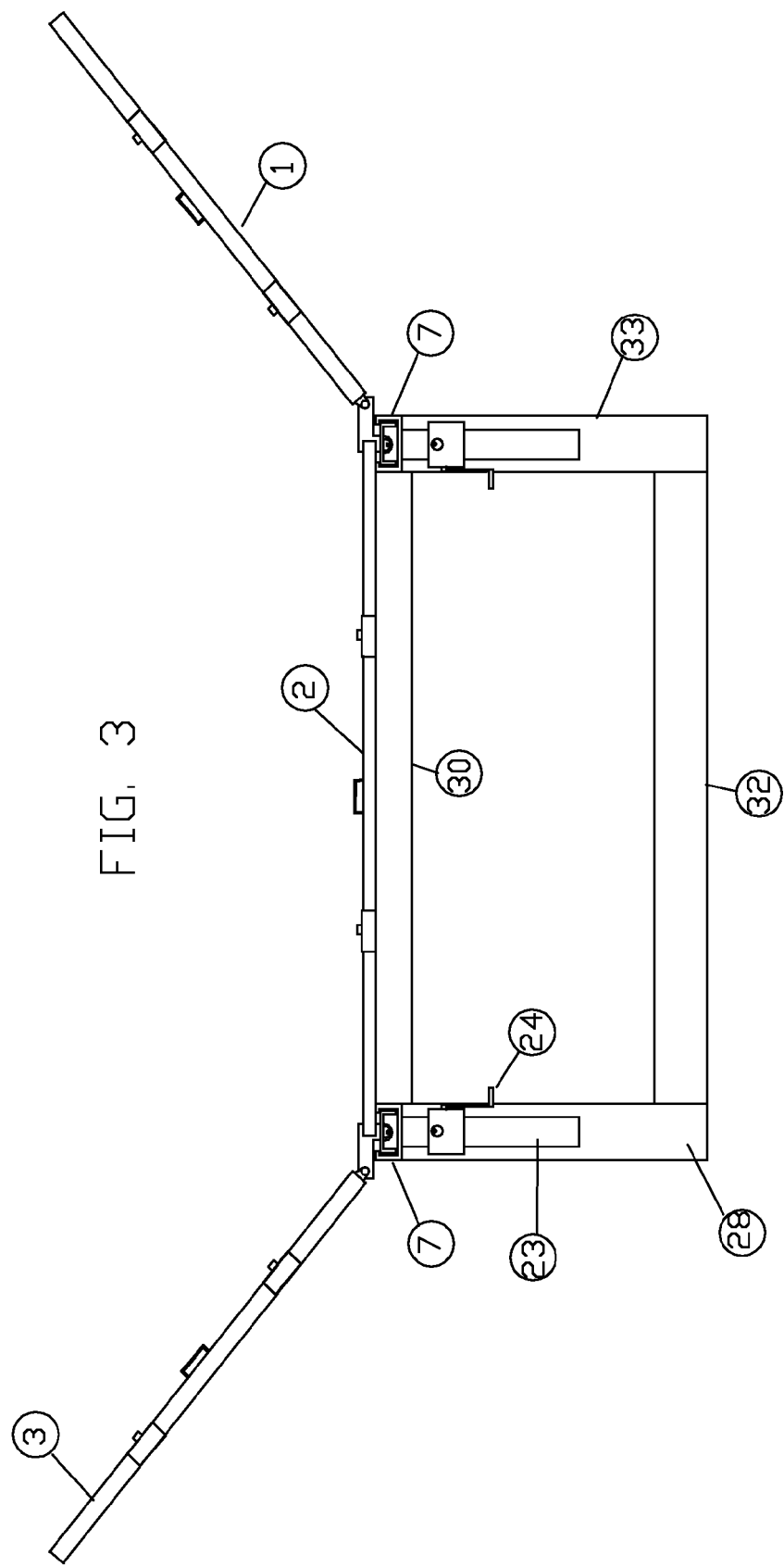
FIG. 3 shows a two-dimensional top view of the invention with the side wings in a forward position.

In reference to FIG. 3, a top plan view of the device is shown with the starboard 1, bow 2, and port 3 cages shown in the standard deployed position. In this view, the support base of the device on the bow of the watercraft can be more easily shown. The deck support base is essentially a rectangular shape formed by base channels 28 and 33, and cross-brace channels 30 and 32. In the preferred embodiment, wide steel U-channel is used with the flat side of the channel contacting the deck surface. Other materials such as square tubing, plate steel, or C-channel could also be used.

Figure 4:
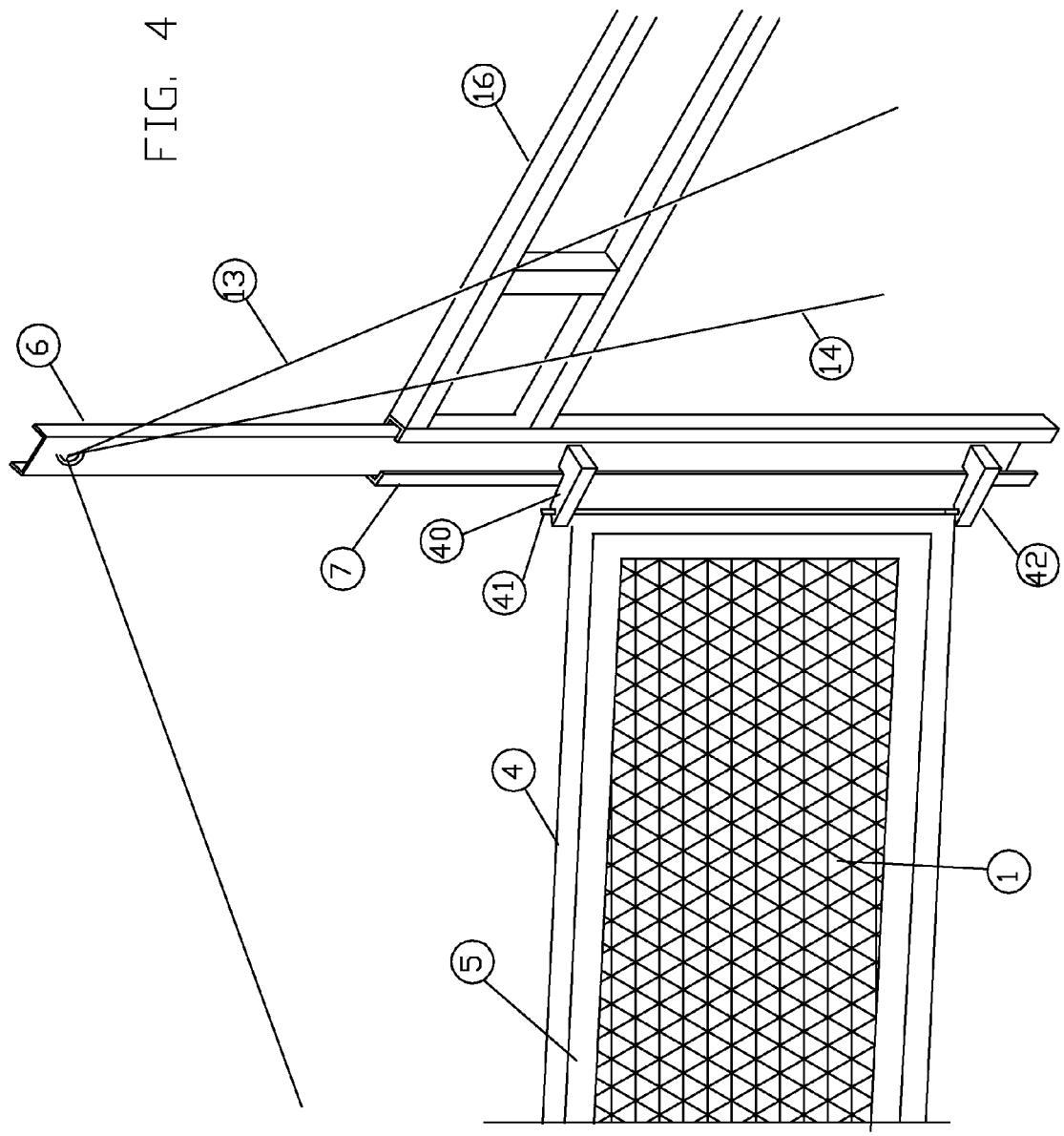
FIG. 4 shows a three-dimensional cut view of one of the side masts and one of the side wings connected thereto. The middle skimmer cage is omitted to allow better view of the design of the side mast, how the side wings attach, and telescoping means of the side mast to adjust the height of all of the skimmer cages relative to the oil/water interface.

In reference to FIG. 4, a 3-dimensional sectional view of the starboard side elevator 6 and guide channel 7 is shown in closer detail. The starboard cage is shown comprised of the back frame 4, the back support mesh 1, and the clamp frame 5. It is understood that this description also applies to the part cage as well. Along the inside edge of the back frame 4, a pivot rod 41 is attached. A short section of the pivot rod 41 extends above and below the back frame. An upper 40 and lower 42 mounting brackets are attached to the forward face of the elevator. Each mounting bracket is generally of an "L-shape" with the foot of the L welded to the forward face of the elevator. The remainder of the "L-shape" extends away from and toward the outside edge of the guide channel 7 where they engage both ends of the pivot rod 41. The lower mounting bracket 42 has a hole of slightly larger diameter than the pivot rod 41. During assembly of the device, the cage is lifted and the bottom extension of the pivot rod 41 is inserted into the hole on the lower mounting bracket. The upper mounting bracket 40 has a "u-shaped" opening in its tip for receiving the upper end of the pivot rod 41 instead of a hole as in the lower mounting bracket 42. Once the upper pivot rod projection is inserted into this u-shaped opening, a carter-key type pin is inserted across the mouth of the opening, thereby locking the pivot rod into the upper mounting bracket 41. The secured cage is now capable of rotating about the pivot rod from a rear position against the side of the watercraft to a forward stowed position (approximately 270°). This pivot rod, lower hole and upper pin lock assembly allows the port and starboard cages to be readily removed for and transport and storage when not in use.

In continued reference to FIG. 4, the guide channel 7 is shown as a standard type "c-channel." The elevator 6 is shown as a standard-type "u-channel" placed inside the guide channel 7. The width of the foot of the mounting brackets 40 and 42 is just slightly less than the diameter of the opening of the guide channel. When welded to the face of the elevator 6, these brackets are free to travel vertically as the elevator telescopes the guide channel 7 but prevents lateral movement of the cages as the mounting brackets contact the inside lips of the "c-channel" comprising the guide channel 7. As probably best seen in FIG. 1, the upper outer edge of the back frame of the bow cage is attached to the underside of the upper mounting bracket by welding its back frame 4 directly thereto. The lower outside edge of the bow cage back frame is attached to the topside of the lower mounting bracket 42. This attachment is identical on both sides of the bow cage 2. When all three cages are attached to the upper and lower mounting brackets, all three cages can be simultaneously moved up or down by moving the elevator 6 up or down.

I claim:

1. A method of skimming oil from the surface of water using oil absorbent pads comprised of the steps of:
   placing a plurality of oil absorbent pads with a porous structural backing in a vertical orientation along a common horizontal plane;
   pinning said absorbent pads into place against the porous structural backing to secure them in a stable position;
   mounting said pads and structural backing to the bow of a watercraft such that the water pads are exposed to the surface of the water;
   moving said watercraft through the water at a controlled speed to expose the pads to floating oil on the surface of the water;
   periodically adjusting the vertical height of the pads as the area in contact with the surface of the water becomes oil saturated and to allow unsaturated areas of each pad to have access to the surface of the water for further oil absorption;
   when the pads become substantially saturated with oil, ceasing forward motion of the watercraft, elevating the pads out of the water, removing them from the structural backing, and replacing them with clean absorbent pads, returning the clean absorbent pads to the surface of the water and continuing forward motion of the watercraft.

2. A skimming device using oil absorbent pads, comprising a floating hull having a power source and a propeller connected together, said hull including skimming means mounted to the bow for exposing said oil absorbent pads to oil floating on a surface of water, said skimming means including, a vertically oriented port, starboard and bow porous cages housing oil absorbent pads.

3. The device of claim 2 where the skimmer further comprises a common vertical adjustment means to move the height of each cage relative to the oil/water interface to expose the entire surface of each pad to the oil/water interface.

4. The device of claim 2 where the port and starboard cages are orientated between 5 and 45 degrees forward relative to the bow cage to form a capture zone for collecting floating debris in addition to exposing the oil pads to the oil/water interface.

5. The device of claim 2 further comprising:
a port and starboard elevator member mounted vertically on the either side of the hull's bow to which the port, starboard and bow cages are attached thereto;
a guide frame surrounding each elevator and attached to a base frame mounted to the bow of the hull such that the elevators can move vertically within each said guide frame;
a vertical adjustment means for each elevator comprised of a cable attached on one end to the base of each elevator and on the other to a mechanical actuator means with a pulley positioned there between for moving said elevators in a vertical motion.

6. The device of claim 2 where the cages are comprised of:
an outer frame of rectangular dimension having an inside height just less than the height of the oil absorbent pad being used;
a porous structural mesh attached to the outer frame to provide a support backing to the oil absorbent pads;
an inner frame of rectangular dimension slightly less than the outer frame inserted inside the outer frame for pinning the oil absorbent pads to the structural mesh; and
a locking means to attach to the outer frame for holding said inner frame in place.

* * * * *